United States Patent [19]

Fleischer

[11] 4,214,728
[45] Jul. 29, 1980

[54] COUPLING DEVICE

[76] Inventor: Henry Fleischer, 18 Notch Park Rd., Little Falls, N.J. 07424

[21] Appl. No.: 920,405

[22] Filed: Jun. 29, 1978

Related U.S. Application Data

[60] Division of Ser. No. 659,370, Feb. 19, 1976, Pat. No. 4,108,475, which is a division of Ser. No. 479,667, Jun. 17, 1974, abandoned, which is a continuation-in-part of Ser. No. 427,149, Dec. 21, 1973, abandoned.

[51] Int. Cl.² .................... F16L 21/00; F16L 37/28
[52] U.S. Cl. .................... 251/149.2; 285/55; 285/320; 285/332.2
[58] Field of Search .................... 251/149.2; 285/320, 285/319, 332.2, 55

[56] References Cited

U.S. PATENT DOCUMENTS

| | | | |
|---|---|---|---|
| 407,922 | 7/1889 | Brown, Jr. | 251/149.2 X |
| 601,749 | 4/1898 | Fennan | 251/149.2 X |
| 736,184 | 8/1903 | Whiteford | 285/332.2 X |
| 798,441 | 8/1905 | Nelson | 285/320 X |
| 940,678 | 11/1909 | Doane | 285/319 |
| 1,103,212 | 7/1914 | Kraemer | 285/319 X |
| 1,384,332 | 7/1921 | Mullenux | 285/320 |
| 1,800,045 | 4/1931 | Bates | 251/149.2 X |

FOREIGN PATENT DOCUMENTS 487564  6/1938  United Kingdom .................. 285/332.3

*Primary Examiner*—William R. Cline

[57] ABSTRACT

An adjustable coupling device is provided which can be secured to each of two sections of conduit, such as two hoses or pipes, by hand, without the need for employing tools. The coupling device comprises a socket member and a plug member which are adapted to be adjustably positioned with respect to each other as one or both members wear, said plug member being adapted to be removably and adjustably disposed in said socket member. The above plug member includes interior walls which define a bore, and securing means, such as teeth or recessed portions. The socket member comprises a body portion having a bore running therethrough defined by the interior walls thereof, which bore is adapted to receive said plug member in a manner such that the bore of said plug member is in communication with the bore of said socket member, and at least one connecting member attached to said socket member and adapted to engage said securing means of said plug member.

13 Claims, 10 Drawing Figures

FIG. 8
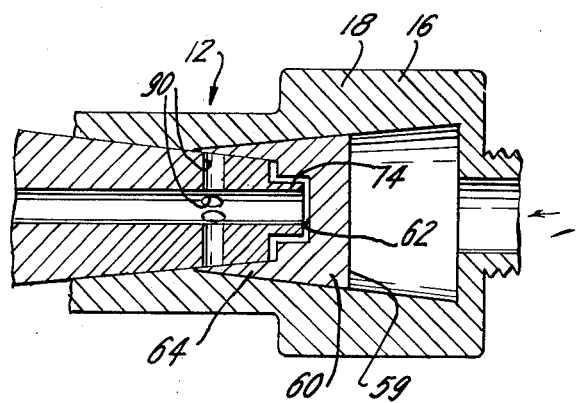
FIG. 9
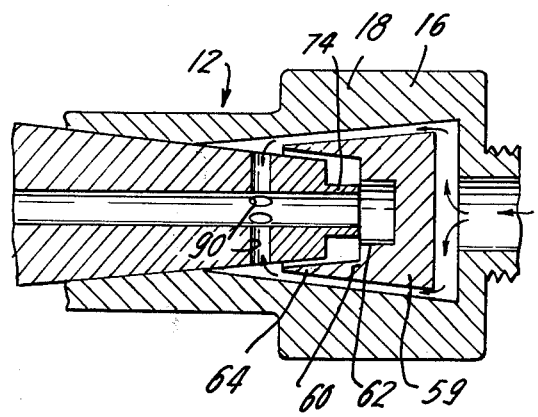
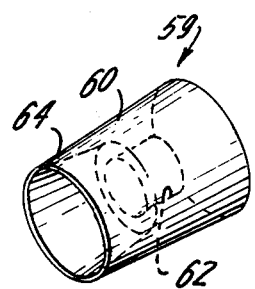
FIG. 10

COUPLING DEVICE

REFERENCE TO OTHER APPLICATIONS

This application is a division of application Ser. No. 659,370 filed Feb. 19, 1976, now U.S. Pat. No. 4,108,475, which is a division of application Ser. No. 479,667 filed June 17, 1974, now abandoned, which is a continuation-in-part of application Ser. No. 427,149, filed Dec. 21, 1973, now abandoned.

FIELD OF THE INVENTION

The present invention relates to a coupling device employed for joining two sections of conduit such as two hoses, together in a fluid-tight manner, the coupling device being so designed so that worn components can be repositioned with respect to each other so that unworn portions thereof can be employed to form the fluid-tight joint.

BACKGROUND OF THE INVENTION

Coupling devices for joining two hoses together in a so-called air-tight manner are well known in the art. They are of rather complex construction and include finely machined surfaces which are subject to wear, and generally comprise two pieces, namely, a socket member and a plug member adapted to be seated in the socket member. These members are usually formed of hard steel for increased durability; however, when the plug member is repeatedly inserted in or removed from the socket member, after a relatively short period, portions of the plug member and socket member tend to wear. When this occurs, the air-tight seal provided by the coupling device is lost and fluids flowing through the hoses, which are joined together by the coupling device, tend to leak out of the coupling device between the worn surfaces of the plug member and socket member. Eventually, fluid leakage around the worn surfaces of the plug member and socket member becomes so great that it becomes intolerable and the coupling device is rendered useless. When this occurs, the coupling device is removed from the conduits or hoses and a new, expensive, coupling device is employed in its place. The worn coupling device cannot be repaired and is usually discarded.

The above-described coupling devices are usually provided with internal or external threads and a nut for attaching each section of the coupling device to a portion of hose. Normally, attaching of the coupling device to the hoses cannot be accomplished without employing a wrench or other tool. Furthermore, where the coupling device has been worn to a point where it must be replaced, it cannot be removed by hand and must be removed with a wrench or other tool. This can indeed be a time consuming task especially where the coupling device is not readily accessible and/or tools are not readily available.

Conventional coupling devices as described above are usually formed of hard steel and therefore are thought to be relatively tough and durable. Accordingly, they are usually carelessly handled and frequently abused and dropped on hard surfaces, such as concrete floors. Notwithstanding the fact that these coupling devices appear to have impact resistant surface, the jolt received is often severe engough to cause the coupling device to break or mal-function.

In accordance with the present invention, an adjustable coupling device is provided which is of simple design and the components thereof are adapted to be adjustably disposed with respect to each other so that when one or more components wear, they can be repositioned with respect to each other to continue to provide a substantially fluid-tight seal or joint.

BRIEF STATEMENT OF THE INVENTION

In accordance with the present invention, an adjustable coupling device is provided comprising a socket member and a plug member adapted to be removably and adjustably disposed in the socket member so that walls of the plug member and socket member contact each other to form a substantially fluid-tight seal. When portions of the plug member and socket member wear, the plug member can be repositioned in the socket member so as to continue to form a fluid-tight seal with the socket member. The plug member includes interior walls which define a bore which runs from end to end of said plug member. The plug member also includes securing means which are employed in connecting the plug member to the socket member as will be described hereinafter. The socket member comprises a body portion having a bore running therethrough defined by the interior walls of the socket member, which bore is adapted to receive the plug member in a manner such that at least a portion of the outer surface of the plug member contacts the wals defining the inner bore of the socket member and the bores of the plug member and socket member are in communication with each other. The socket member also includes at least one connecting member attached thereto and adapted to engage at least one of the securing means of the plug member when the plug member is disposed in the socket member.

In a preferred embodiment of the invention, the plug member comprises a first tubular end segment, an intermediate segment, the narrow end of which is connected to the tubular end segment, and a second end segment connected to the wider end segment of the conical-like member, the inner bore of the plug member running through each of said first end, intermediate and second end segments of the plug member. The socket member comprises a body portion including first and second end portions and an intermediate portion. The interior walls of the body portion define a bore comprising a tapered passage, the wide segment of which extends from the first end portion into the intermediate portion. The first tubular end segment and the intermediate segment of the plug member are adapted to seat in the tapered passage of the socket member with at least a portion of the outer surface of the plug member in contact with a portion of the interior walls of the socket member.

The tapered passage of the socket member preferably includes a wear-resistant lining material which contacts the outer surface of the conical-like segment of the plug member when the plug member is seated in the tapered passage. The wear-resistant lining material may comprise a metal, such as steel, hard rubber, plastic, leather or other material adaptable for gaskets, and is designed to present a wear resistant surface to the plug member, which surface is designed to wear faster than the plug member. As will be apparent to one skilled in the art, the plug member will be constantly inserted and removed from the socket member and this will cause wear on the plug member including the tubular end segment thereof and lining material of the socket member. As the lining material wears, the plug member can be inserted deeper into the tapered passage so as to present the wider portion of the intermediate section of the plug member to the lining material of the socket member. In this manner, even though the lining of the socket member, and perhaps the outside surface of the plug member may wear, fluid-tight contact between the plug member and socket member may be still maintained by merely repositioning the plug member in the socket member.

Each of the socket member and plug member will include means for connecting each of these members to a conduit section or hose. For example, each of these members may include a threaded section which is adapted to be engaged with a fitting secured to a hose section.

BRIEF DESCRIPTION OF THE FIGURES

FIGS. 6 to 8 are views of a portion of the coupling device shown in FIG. 1 wherein alternative embodiments of the movable closure member is shown in its closed position;

FIG. 9 is a view of the movable closure member shown in FIG. 8 in its open position; and FIG. 10 is a perspective view of the movable closure member itself also shown in FIGS. 8 and 9.

DETAILED DESCRIPTION OF THE FIGURES

Figure 1:
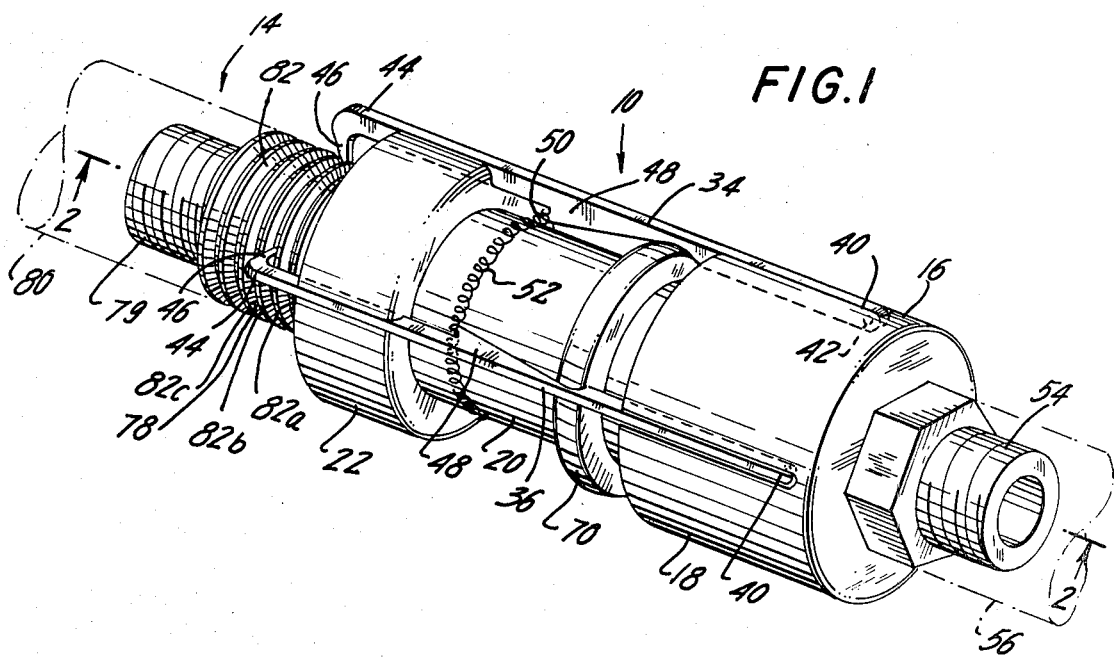
FIG. 1 is a perspective view of an adjustable coupling device in accordance with the invention.

Referring to the accompanying Figures wherein like parts are represented by like numerals in the several views; in FIGS. 1 to 5 there is shown a coupling device in accordance with the present invention identified generally by the numeral 10. The coupling device 10 includes a socket member generally indicated by the numeral 12 and a plug member generally indicated by the numeral 14. The socket member 12 includes a body portion 16 having a first end portion 18, and intermediate portion 20 and a second end portion 22. The socket member 12 also includes a tapered bore 24 defined by the inner tapered walls 26 and the inner walls 28 of the socket member 12. The bore or tapered passage 24 extends from end to end of the socket member 12 and includes a wide end 30 and a narrow end 32 so that, in effect, the tapered passage forms a truncated cone-like passage. The inner walls of the tapered passage are preferably lined with a wear resistant material 31 such a plastic material, for example, polyethylene or polyurethane, or metal, for example, brass, lead, steel and the like.

Figure 3:
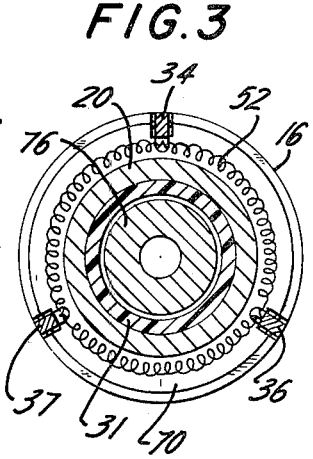
FIG. 3 is a cross-sectional view of the coupling device shown in FIG. 2 taken along the lines 3—3 thereof.
Figure 5:
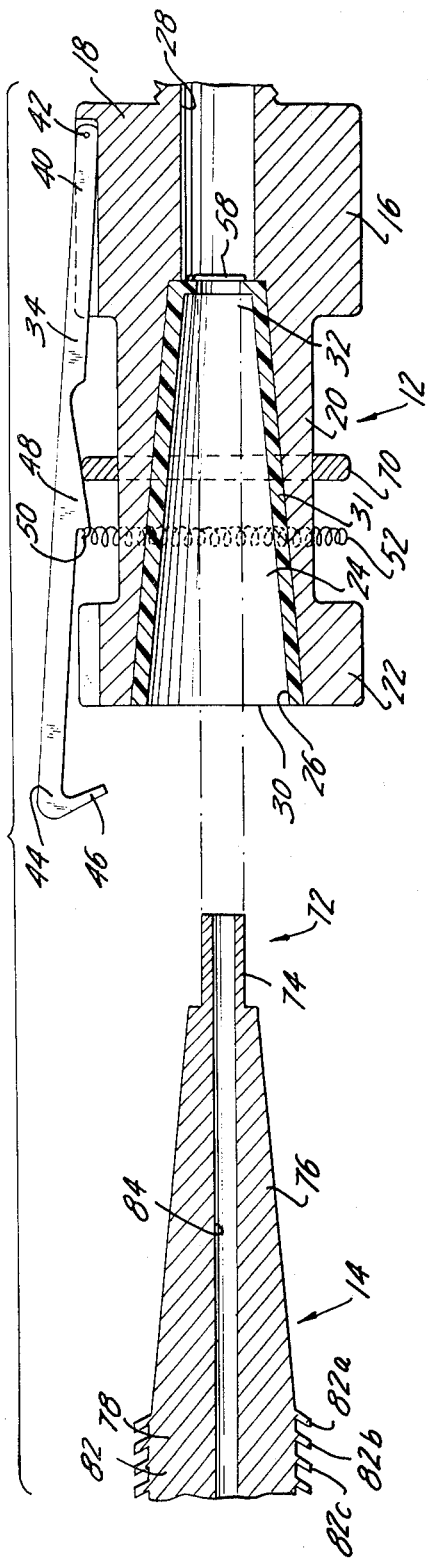
FIG. 5 is an exploded view of the coupling device shown in FIG. 2.

The socket member also preferably includes three connecting rods 34, 36 and 37 as shown in FIGS. 1 and 3, which are fitted in slots in the body portion 16 of the socket member 12 in a manner such that at least a portion of the connecting rods will be disposed below the outer surface of the body portion 16 of the socket member 12. In this manner, the connecting rods will not be broken or other wise damaged if the body portion of the socket member 12 is subjected to a heavy blow. Each of the connecting rods comprises a first end portion 40 which is pivotally connected by means of pivot pin 42 to the first end 18 of the body portion 16. The connecting rods will also include a second end portion 44 which includes first ataaching means 46 in the form of a hook-like member, the purpose of which will become apparent hereinafter. The intermediate portion 48 of the connecting rods includes attaching means 50. A circular coiled spring is disposed about the body 16 of the socket member and is adapted to engage the second attaching means 50 of the connecting rods so as to hold the connecting rods against the body portion of the socket member, where desired, and to prevent the connecting rods from springing away from the socket member.

The first end 18 of the socket member 12 also includes securing means 54 for use in securing the socket member to an end of a hose section 56 (shown in phantom). Such securing means 54 may comprise an internally threaded or externally threaded section which is adapted to be secured to a fitting attached to the hose section 56.

The socket member 12 also includes an annular ring member 70 which is disposed about the body portion of the socket member beneath the connecting rods 48, as shown. When the ring member 70 is moved towards the second end 22 of the socket member 12, the ring member 70 contacts the connecting rods 48 and causes the connecting rods to pivot upwardly so that the first attaching members or hook-like members 46 become disengaged from the plug member 14, as will be described in detail hereinafter.

The plug member 14 comprises a first end 72 which preferably is in the form of a tubular end segment 74 as shown, an intermediate conical-like segment 76 and a second end segment 78. The second end segment 78 includes hose connecting means 79 for securing the plug member 14 to a hose section, which hose connecting means may take the form of an internally or externally threaded section which is adapted to be secured to a fitting connected to the hose section 80 (shown in phantom).

The second end segment 78 of the plug member 14, that is the segment connected to the conical-like intermediate segment 76, includes a plurality of securing means 82 such as connecting teeth. The connecting teeth 82 extend from the surface of the conical member and are angled backwardly so that they can be engaged by the hook-like attaching means 46 of the connecting rods 48. The teeth 82 are preferably blunted at their ends so as to present a substantially wear resistant surface to the hook-like members 46 of the connecting rods 48.

A bore or passage 84 extends through the plug member 14, that is through each of said first and second end segments and said intermediate segment, as shown.

The plug member 14 is adapted to be seated in the tapered passage 24 of the socket member 12 so that the outer surfaces of the plug member 14 contact the inner walls or lining 31 of the tapered passage 24.

Figure 2:
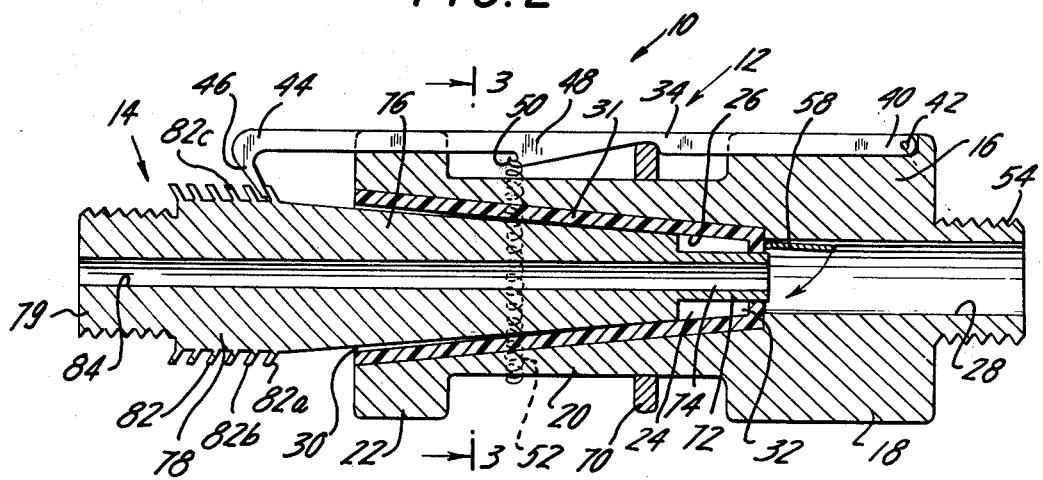
FIG. 2 is a cross-sectional view of the adjustable coupling device taken along lines 2—2 of FIG. 1.
Figure 4:
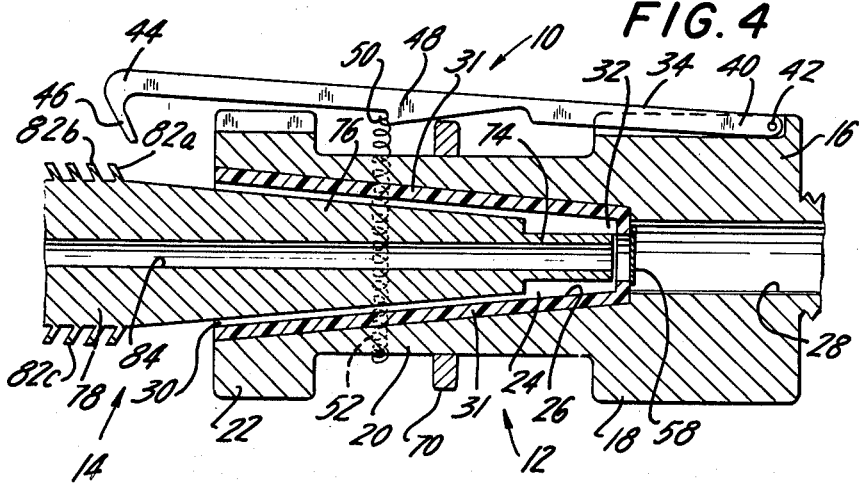
FIG. 4 is a fragmentary cross-sectional view of the coupling device shown in FIG. 2 where the plug member is not fully seated in the socket member.

A movable closure member in the form of a disk 58 is hingedly secured to the inner walls 28 of the socket member 12 at the narrow end 32 of the tapered passage. The disk 58 will normally be in its closed position, that is, it will cover the opening at the narrow end 32 of the tapered passage of the socket member 12 when the plug member 14 is not seated in the tapered passage. As will be seen hereinafter, when the plug member 14 is seated in the tapered passage 24, the tubular end segment 74 of the plug member will contact the closure member 58 and cause it to open so as to open the narrow end 32 of the tapered passage and allow flow of fluid from the hose section 56 through the bore 24 of the socket member 12 into the bore 84 of the plug member 14 and thence into the hose section 80. The fluid flowing from the hose section 56 through the bore 54 into the tapered passage 24 will cause the closure member or disk 58 to remain in the open position as shown in FIG. 2.

Another embodiment of the movable closure member 59 is shown FIGS. 8, 9, and 10 and comprises solid body 60 which includes a recessed area 62 and annular wedge-shaped legs 64. The plug member 14 includes a series of openings 90. The closure member 59 is adapted to be disposed over the narrow end 32 of the tapered passage 24 of the socket member 12 when the plug member 14 is not seated in the tapered passage. In this manner, flow from the bore 28 into the tapered passage is obstructed. However, as shown in FIG. 9, when the plug member 14 is inserted and seated in the socket member 12, the end portion 74 of the plug member causes the closure member 59 to move away from the narrow end 32 of the socket member 12 and allow flow of fluid, such as air or water, about said closure member 59, into narrow end 32 of the tapered passage and through the openings 90 of the plug member.

The socket member 12, as well as the plug member 14, may be formed of any hard material such as a metal, or a plastic, hard rubber, leather, or other material adaptable for gaskets, as will be apparent to one skilled in the art. Furthermore, it will be appreciated that when the closure member 59 is employed instead of the disk 58 to close off the narrow end 32 of the tapered passage, the bore 24 of the socket member defined by the walls 28 will extend beyond the narrow end 32 of the tapered passage so that the wedge-like legs 64 may be seated about the narrow end 32 as shown in FIG. 8.

Figure 6:
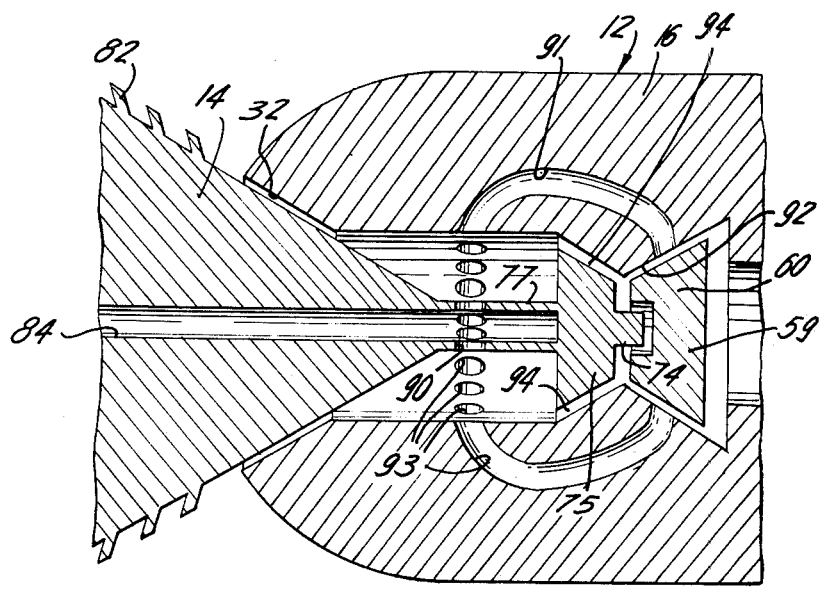

In FIG. 6, a movable closure member 59 is shown, which is similar to that shown in FIGS. 8 to 10. The closure member 59 is adapted to seat in the opening 92 formed by the inclined surfaces 94 of the body portion 16 of the socket member 12, to thereby cut off flow of fluid through socket member 12 when the plug member 14 is not seated therein. As shown, the plug member 14, in this embodiment, includes a tubular end segment 74. However, the bore 84 running through plug member 14 stops short of the tubular end segment 74.

The portion 77 of the plug member includes openings 90 which communicate with bore 84. Furthermore, the tubular end segment 74 includes a trapezoidal shaped member 75 which is small enough to clear the narrow tapered passage portion 32 of the body 16 of the socket member 12. The body 16 of the socket member 12 includes internal passages 91 and 93. Furthermore, stops 6 and 8 are connected to an upper portion of body 16 and prevent the closure member 59 form being completely dislocated from the passage 24.

When the plug member 14 is seated in the socket member 12, the end segment 74 of the plug member causes the closure member 59 to be moved out of the passage portion 32 so as to allow flow of fluid into the passages 91 and 93 of the body 16 and through the openings 90 into the bore 84 of the plug member. The embodiment of FIG. 6 is especially adapted for the automatic connection of the plug member 14 in the socket member 12. When the plug member is inserted in the socket member the air flowing through the passages 91 and 93 will force the member 75 against the inclined surfaces 94 of the body 16, thereby automatically adjusting the position of the plug member in the socket member.

Figure 7:
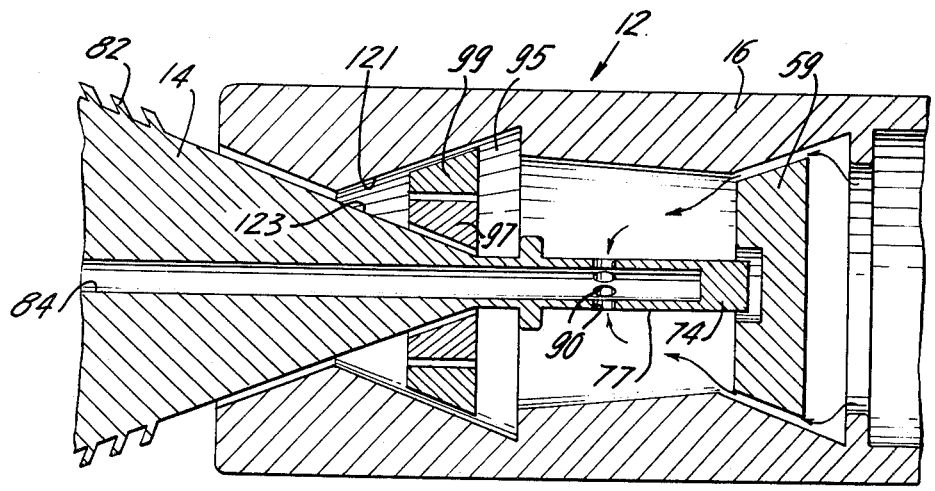

The closure member embodiment shown in FIG. 7 is similar to that shown in FIG. 6. However, the trapezoidal-shaped member 75 is not present. Furthermore, seated in the open area 95 in the body 16 of the socket member 12 are a pair of rings 97 and 99. When the plug member 14 is seated in the socket member 12, fluid pressure acting on the rings 97, 99 cause the rings to form a fluid-tight seal between the outer surfaces of the plug member and the inner surfaces of the socket member. The fluid pressure forces the rings to close or move down toward the end of the plug member having teeth 82, so that ring 99 is forced against the wall 121 of the socket member and ring 97 is forced against wall 123 of the plug member. The rings are formed of resilient material such as conventional gasket material. Accordingly, the surfaces of the rings will wear after repeated use. However as the rings wear, they will be moved, by fluid pressure, deeper into the area defined by walls 121, 123 of the socket and plug members, respectively, and continue to form a fluid-tight joint between these members.

Inasmuch as the plug member 14 will frequently be inserted in and removed from the tapered passage of the socket member 12, the tubular end segment 74 will begin to wear as well as the sides of the intermediate conical-like segment 76. When these members wear sufficiently so as to cause fluid leakage between the plug member and the socket member, when the plug member is seated in said socket member, the plug member is adapted to be moved deeper into the tapered passage of the socket member so that the surfaces of the conical-like segment 76 of the plug member continue to contact the walls of the tapered passage of the socket member to continue to form a substantially fluid-tight seal between the socket member and the plug member. When the plug member 14 is moved deeper into the socket member 12, the hook-like attaching means 46 will be closer to a second set of teeth 82b and will now engage teeth 82b. As the tubular end segment 74 and the surfaces of the conical-like segment 76 continue to wear, the plug member can be moved yet deeper into the tapered passage to continue to establish a fluid-tight seal between the plug member and socket member and in such case, as will be apparent, the hook-like members 46 of the connecting rods 48 will be connected to the third securing means or teeth 82c and so forth.

It will be apparent that, eventually, the wear on the plug member will be so great that the plug member can no longer be moved deeper into the socket member and still engage the teeth 82 thereof with the connecting rods 48 of the socket member. When this occurs, the coupling device including the socket member 12 and the plug member 14 will have to be disconnected from the hose sections 56 and 80 and replaced by a new socket member and plug member, respectively. However, it will be appreciated that the coupling device of the invention has a substantially longer useful life than conventional coupling devices now available, inasmuch as the plug member and socket member of the coupling device of the invention can be readjusted with respect to each other, to compensate for wear of these parts, while still continue to maintain a substantially fluid-tight seal between these members.

What is claimed is:

1. A substantially fluid-tight coupling device comprising, in combination, a socket member and a plug member adapted to be removably disposed in said socket member in a first position to form a substantially fluid-tight seal between said members, said plug member comprising a conical-like member including tapered outer walls, and inner walls and an end segment, said inner walls defining a bore running through said plug member, and at least two securing means, one of said securing means being disposed closer to a narrow end of said tapered outer walls than the other of said securing means, said socket member comprising a body portion including solid rigid outer walls and tapered inner walls defining a tapered passageway running through said body portion, at least one wear resistant lining disposed between said tapered outer walls of said plug member and said tapered passageway of said socket member, said tapered outer walls of said plug member being adapted to seat in an initial portion of said tapered passageway of said socket member, to define said first position and restricted to said initial position when so seated in that it cannot be moved deeper into the socket member, said plug member and socket member by means of said lining forming a substantially fluid-tight seal between said members, and only after portions of said lining have worn, said plug member is adapted to be repositioned with respect to said initial portion of said passageway of said socket member to a second portion of said passageway to define a second position and thereby form, by means of said lining, a substantially fluid-tight seal with said socket member, said socket member further including at least one securing means, a portion of which is connected to said body portion of said socket member, said at least one securing means being adapted to engage at least one of said securing means of said plug member when said plug and socket members are in their first position, and after a portion of said lining has worn and said plug member has been repositioned in said socket member to define said second position, a second of said securing means of said plug member and said at least one securing means of said socket member are adapted to be engaged in a second position relative to each other to retain said plug member in said socket member in substantially fluid-tight engagement, and movable closure means disposed in said passageway of said socket member, said closure means being in its closed position when said plug member is not seated in said socket member to close off said passageway of said socket member, and said closure means is adapted to be opened by said end segment of said plug member when said plug member is seated in said socket member.

2. The coupling device as defined in claim 1 wherein said plug member includes first and second end portions, and said passageway of said socket member includes first and second end sections, whereby when said plug member and socket member are in said first position, said first end portion of said plug member is spaced from said second end section of said socket member, whereby after portions of said lining have worn, said plug member can be moved deeper into said socket member to said second position.

3. A coupling device as defined in claim 1 wherein said end segment of said plug member comprises a first tubular end segment tapering outwardly to an intermediate segment and a second end segment, and said socket member comprises said body portion incuding first and second end portions, and an intermediate portion, said inner walls of said socket member defining a tapered passage running through at least said first end and intermediate portions, the wide end of said tapered passage extending from said first end portion tapering inwardly into said intermediate portion, the first tubular end segment and intermediate segment of said plug member being adapted to seat in said tapered passage of said socket member in said first and second positions to form, by means of said lining, a substantially fluid-tight seal with said socket member, said first tubular end segment of said plug member stopping short of the narrow end of said tapered passage of said socket member when said plug member is disposed in said socket member in said first position, the end of the first tubular end segment of the plug member and the narrow end of the tapered passage of the socket member defining a space into which the plug member can be moved into said second position after portions of the lining have worn.

4. The coupling device in accordance with claim 3 wherein said tapered passage of said socket member includes a wear-resistant lining which contacts the outer surface of said first tubular end segment of said plug member when said plug member is seated in said tapered passage of said socket member.

5. The coupling device in accordance with claim 3 wherein said second end portion of said socket member includes attaching means for attaching said socket member to a conduit.

6. The coupling device in accordance with claim 3 wherein said second end segment of said plug member includes attaching means for attaching said plug member to a conduit.

7. The coupling device in accordance with claim 3 wherein said securing means of said socket member comprises at least one connecting rod, a first end of which is pivotally connected to said body portion, said connecting rod being adapted to engage at least one securing means of said plug member.

8. The coupling device in accordance with claim 7 wherein said connecting member comprises at least a pair of connecting rods each of which is pivotally connected to said body portion of said socket member, each rod being comprised of a first end portion, a second end portion which includes hook-like members for attaching said connecting rod to said securing means of said plug member, and an intermediate portion which includes attaching means, and said coupling device further includes resilient support means which surrounds said body portion of said socket member, said resilient support means being secured to said attaching means of said connecting rods to thereby maintain said connecting rods in engagement with said securing means of said plug member.

9. The coupling device in accordance with claim 3 wherein said plug member is adapted to be moved deeper into said tapered passageway of said socket member as the first tubular end segment and/or the surfaces of said conical-like segment wear, so that said surfaces of said conical-like segment continue to contact the walls of said tapered passageway of said socket member to continue to form a substantially fluid-tight seal between said socket member and plug member.

10. The coupling device in accordance with claim 9, wherein said connecting rod of said socket member is adapted to engage said second securing means when said plug member is moved from its initial seated position to a second deeper position within said socket member.

11. The coupling device in accordance with claim 3 wherein said securing means of said plug member comprises a plurality of teeth extending from said plug member; said teeth being disposed one behind the other, extending from said second end segment toward said tapered segment of said plug member.

12. The coupling device in accordance with claim 1 wherein said closure member comprises a disk pivotally mounted to the inner walls defining said bore of said socket member.

13. The coupling device as defined in claim 1 wherein said lining is disposed in said socket member.

* * * * *